US007968651B2

(12) United States Patent
Huh et al.

(10) Patent No.: US 7,968,651 B2
(45) Date of Patent: Jun. 28, 2011

(54) CONDUCTING POLYMER FILM COMPOSITION FOR ORGANIC OPTO-ELECTRONIC DEVICE COMPRISING GRAFT COPOLYMER OF SELF-DOPED CONDUCTING POLYMER AND ORGANIC OPTO-ELECTRONIC DEVICE USING THE SAME

(75) Inventors: Dal Ho Huh, Suwon-si (KR); Mi Young Chae, Yongin-si (KR); Tae Woo Lee, Seoul (KR); Woo Jin Bae, Hwaseong-si (KR); Eun Sil Han, Yongin-si (KR)

(73) Assignee: Cheil Industries Inc., Gumi-si (KR)

( * ) Notice: Subject to any disclaimer, the term of this patent is extended or adjusted under 35 U.S.C. 154(b) by 504 days.

(21) Appl. No.: 12/114,018

(22) Filed: May 2, 2008

(65) Prior Publication Data

US 2008/0234442 A1 Sep. 25, 2008

Related U.S. Application Data

(63) Continuation-in-part of application No. PCT/KR2006/001679, filed on May 3, 2006.

(30) Foreign Application Priority Data

Nov. 3, 2006 (KR) ............................ 2005-0105089

(51) Int. Cl.
*C08F 126/06* (2006.01)

(52) U.S. Cl. ............... 525/326.8; 525/326.9; 525/327.2; 525/327.5; 525/540

(58) Field of Classification Search ............... 525/326.8, 525/326.9, 327.2, 327.5, 540
See application file for complete search history.

(56) References Cited

U.S. PATENT DOCUMENTS

| | | | | |
|---|---|---|---|---|
| 4,539,507 | A | 9/1985 | VanSlyke et al. | |
| 4,720,432 | A | 1/1988 | VanSlyke et al. | |
| 4,769,292 | A | 9/1988 | Tang et al. | |
| 5,126,214 | A | 6/1992 | Tokailin et al. | |
| 5,229,845 | A | 7/1993 | Ueba et al. | |
| 5,370,825 | A | 12/1994 | Angelopoulos et al. | |
| 5,955,528 | A | 9/1999 | Sato et al. | |
| 6,025,218 | A | 2/2000 | Brotherton | |
| 6,124,963 | A | 9/2000 | Schumaker | |
| 6,692,663 | B2 | 2/2004 | Zhou et al. | |
| 7,033,646 | B2 | 4/2006 | Zhang | |
| 7,229,574 | B2 * | 6/2007 | Jo et al. | 252/500 |
| 7,446,166 | B2 * | 11/2008 | Lee et al. | 528/423 |
| 2005/0033014 | A1 | 2/2005 | Zhang | |
| 2008/0100783 | A1 * | 5/2008 | Bae | 349/96 |

FOREIGN PATENT DOCUMENTS

| | | |
|---|---|---|
| EP | 387715 | 9/1990 |
| KR | 10-2002-0028227 A | 4/2002 |
| KR | 10-2004-0064306 A | 7/2004 |
| KR | 10-2005-0012313 A | 2/2005 |
| WO | 02/051958 | 7/2002 |

OTHER PUBLICATIONS

Shuichi Maeda et al.; "New Reactive Polyelectrolyte Stabilizers for Polyanilne Colloids"; Eur. Polym. J; vol. 33; No. 3; pp. 245-253.*
International Search Report for corresponding International Application PCT/KR2006/001679, mailed Aug. 14, 1006.
International Preliminary Report on Patentability in counterpart International Application No. PCT/KR2006/001679 dated May 6, 2008.

* cited by examiner

*Primary Examiner* — Bernard Lipman
(74) *Attorney, Agent, or Firm* — Summa, Additon & Ashe, P.A.

(57) ABSTRACT

Provided are a conducting polymer film composition comprising a graft copolymer of a self-doped conducting polymer and an organic opto-electronic device comprising a conducting polymer film formed of the above-mentioned composition. In the graft copolymer, the conducting polymer and a polyacid are connected to each other via chemical binding. Therefore, the composition of the present invention can be used in organic opto-electronic devices with minimal or no dedoping occurring from heat generated inside the device. As a result, the present invention can improve efficiency and life-time of the organic opto-electronic device.

19 Claims, 3 Drawing Sheets

CONDUCTING POLYMER FILM COMPOSITION FOR ORGANIC OPTO-ELECTRONIC DEVICE COMPRISING GRAFT COPOLYMER OF SELF-DOPED CONDUCTING POLYMER AND ORGANIC OPTO-ELECTRONIC DEVICE USING THE SAME

CROSS-REFERENCE TO RELATED APPLICATIONS

This application is a continuation-in-part application of PCT Application No. PCT/KR2006/001679, filed May 3, 2006, pending, which designates the U.S., and which is hereby incorporated by reference in its entirety. This application also claims priority under 35 USC Section 119 from Korean Patent Application No. 10-2005-0105089, filed Nov. 3, 2005, which is also hereby incorporated by reference in its entirety.

FIELD OF THE INVENTION

The present invention relates to a polymer film composition comprising a conducting polymer and an opto-electronic device using the same. More specifically, the present invention relates to a polymer film composition comprising a conducting polymer capable of improving the efficiency and life-time of an opto-electronic device and an opto-electronic device using the same.

BACKGROUND OF THE INVENTION

Opto-electronic devices refer to, in a broad sense, devices that convert light energy into electric energy or vice versa and include, for example organic electroluminescent devices, solar cells, transistors, and the like.

Among other things, recent advances in Flat-Panel Display (hereinafter, referred to as FPD) technology have focused a great deal of attention on organic electroluminescent devices.

Liquid crystal displays (LCDs) make up the largest proportion of current FPDs, comprising more than 80% of the FPD market, due to significant development in related technologies. However, such LCDs suffer from critical disadvantages such as low response speeds exhibited by large screens having a size of more than 40 inches, narrow viewing angles, and the like. As such, there is a need for the development of novel displays in order to overcome such disadvantages.

Organic electroluminescent (EL) displays have received a great deal of interest among FPDs as the only display mode satisfying the requirements for the next-generation of FPDs. For example, organic EL displays can offer advantages such as low driving voltage, self luminescence, thin film-type, wide viewing angles, rapid response speed, high contrast and low cost.

Currently, intensive and extensive research in the area of opto-electronic devices including such organic electroluminescent (EL) devices is directed to the formation of conducting polymer films, in order to increase device efficiency via smooth transportation of electric charges generated from electrodes, i.e., holes and electrons, to the inside of the opto-electronic devices.

In particular, the organic electroluminescent (EL) device is an active luminescence-type display utilizing phenomena in which the application of electric current to a fluorescent or phosphorescent organic compound thin film (hereinafter, referred to as organic film) leads to the generation of light as electrons and holes combine in the organic film. To improve device efficiency and reduce operating voltage, such an organic electroluminescent (EL) device generally has a multi-layer structure including a hole-injection layer, a light-emitting layer and an electron-injection layer containing conducting polymers, instead of a single light-emitting layer alone as the organic layer.

Further, such a multi-layer structure can be simplified by fabricating one layer to perform multi-functions while removing the respective corresponding layers. The simplest structure of the EL device is made up of two electrodes and an organic layer disposed therebetween that performs all the functions including light emission.

However, in fact, in order to increase the luminance of the device, an electron-injection layer or a hole-injection layer should be introduced into an electroluminescent assembly.

A large number of organic compounds having electric charge (holes and/or electrons) transporting properties are known and can be found in a variety of scientific journals and literature. A general overview of such species of materials and uses thereof is found, for example, in European Patent Publication No. 387 715, and U.S. Pat. Nos. 4,539,507, 4,720,432 and 4,769,292.

Poly(3,4-ethylenedioxythiophene) (PEDOT)/poly(4-styrenesulfonate) (PSS), commercially available from Bayer AG under name of Baytron-P, is a representative organic compound capable of transporting electric charges currently used in the form of an aqueous solution in soluble organic EL devices. This compound is widely used in the fabrication of organic EL devices for the formation of the hole-injection layer on an indium tin oxide (ITO) electrode via spin coating. PEDOT/PSS, a hole-injecting material, has a structure of Formula 1 below:

(Formula 1)

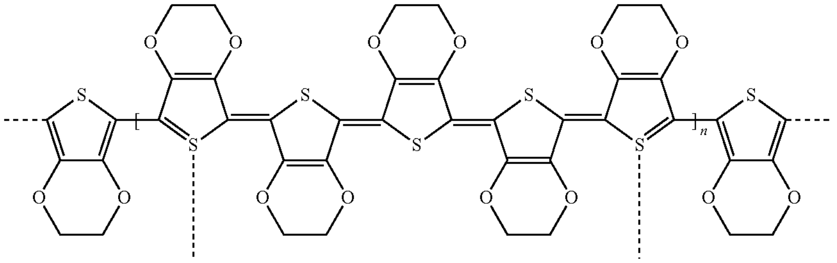

-continued

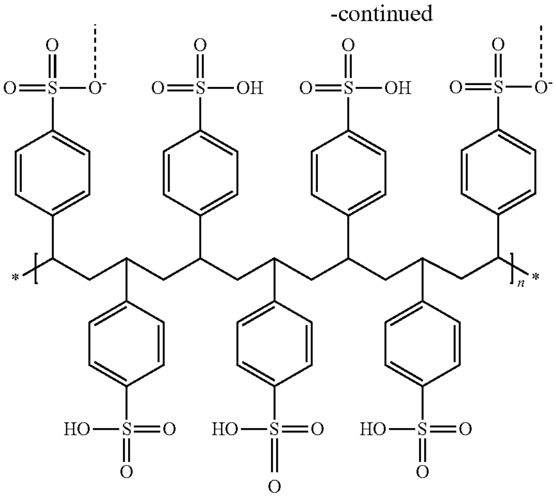

A conducting polymer composition of PEDOT/PSS in which a conducting polymer of poly(3,4-ethylenedioxythiophene) (PEDOT) is doped with a polyacid of poly(4-styrenesulfonate) (PSS) can be used to form the hole-injection layer. Due to its high water-uptake, however, it is difficult to use PEDOT/PSS in cases requiring the removal of water. In addition, because the conducting polymers are simply doped on PSS polymer chains, PEDOT/PSS undergoes dedoping from heat generated in the devices, thus making it difficult to create stable devices. Further, the PSS portion, simply doped on PEDOT, decomposes via reactions with electrons, thus liberating materials such as sulfate, which in turn may diffuse into an adjacent organic film, for example, the light emitting layer. Such diffusion of hole-injection layer derived-materials into the light emitting layer causes exciton quenching and leads to decreased efficiency and life-time of the organic electroluminescent device. In addition, it can be difficult to control the ratio of the conducting polymer when using PEDOT/PSS and thus it is difficult to obtain polymers having the same properties.

Therefore, in order to achieve satisfactory efficiency and life-time in opto-electronic devices such as organic electroluminescent devices, there is an increasing need for the development of a novel conducting polymer and a composition thereof.

SUMMARY OF THE INVENTION

The present invention is directed to a conducting polymer film composition comprising a graft copolymer of a self-doped conducting polymer. The conducting polymer film composition of the invention can contain a lower content of residues that will degrade via reactions with electrons, is capable of controlling conductivity and a work function via adjustment of the proportion of a conducting polymer, and is soluble in water and polar solvents.

The present invention also provides a conducting polymer film comprising the above-mentioned composition and an organic opto-electronic device comprising the same.

The conducting polymer film composition useful for an organic opto-electronic device comprises a conducting polymer and a solvent, wherein the composition comprises a graft copolymer of a self-doped conducting polymer represented by Formula 2 below:

(Formula 2)

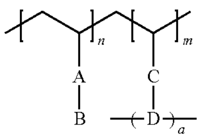

wherein A is selected from the group consisting of substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, and substituted or unsubstituted C2-C30 heteroaryl ester;

B represents an ionic group or an ionic group-containing group, wherein the ionic group is a conjugate of an anion and a cation, the anion being selected from $PO_3^{2-}$, $SO_3^-$, $COO^-$, $I^-$ and $CH_3COO^-$ and the cation being selected from metal ions such as $Na^+$, $K^+$, $Li^+$, $Mg^{+2}$, $Zn^{+2}$ and $Al^{+3}$ or organic ions such as $H^+$, $NH_3^+$ and $CH_3(—CH_2—)_nO^+$, and n is an integer from 1 to 50;

C is selected from the group consisting of —O—, —S—, —NH—, substituted or unsubstituted C1-C30 alkylene, substituted or unsubstituted C1-C30 heteroalkylene, substituted or unsubstituted C6-C30 arylene, substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C6-C30 arylamine, substituted or unsubstituted C6-C30 pyrrole, substituted or unsubstituted C6-C30 thiophene, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, and substituted or unsubstituted C2-C30 heteroaryl ester;

D represents substituted or unsubstituted aniline, substituted or unsubstituted pyrrole, substituted or unsubstituted thiophene or copolymers thereof; and m, n and a represent mole fractions of the respective monomers, and m is greater than 0 and equal to or smaller than about 10,000,000, n is equal to or greater than 0 and smaller than about 10,000,000, a/n is greater than 0 and smaller than about 1, and a is an integer from 3 to 100.

In accordance with another aspect of the present invention, there is provided a conducting film for an organic opto-electronic device comprising the above-mentioned conducting polymer film composition.

In accordance with yet another aspect of the present invention, there is provided an organic opto-electronic device comprising the above-mentioned conducting film

DETAILED DESCRIPTION OF THE INVENTION

Figure 1:
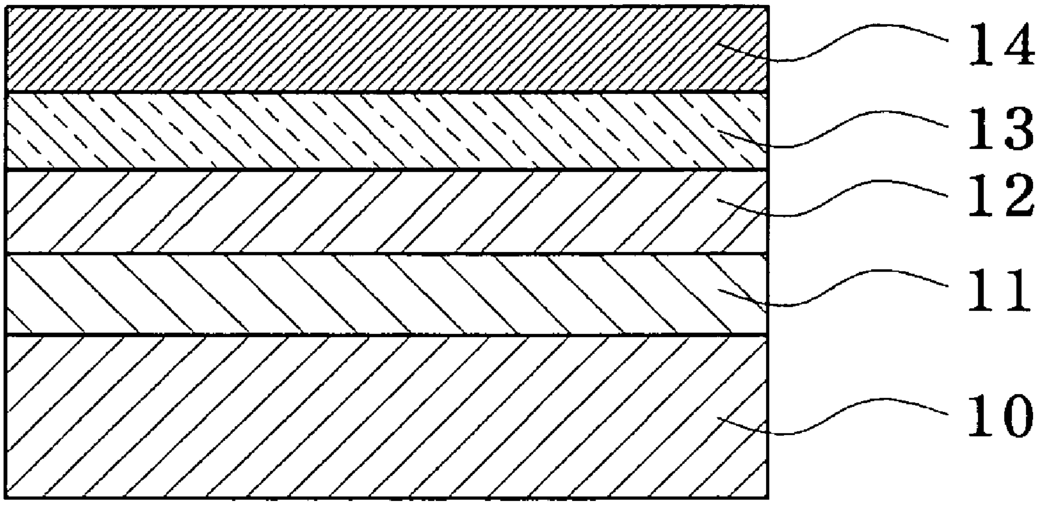
FIGS. 1 through 4 are cross-sectional views showing a stacked structure of an organic electroluminescent device prepared by Examples in accordance with the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a graft copolymer of a conducting polymer comprising a polyacid represented by Formula 2 below:

(Formula 2)

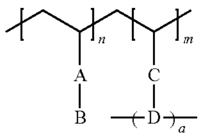

In Formula 2, A is carbon-based, and is selected from the group consisting of substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester and substituted or unsubstituted C2-C30 heteroaryl ester.

In Formula 2, B represents an ionic group or an ionic group-containing group. As used herein, the ionic group comprises a conjugate of an anion and a cation. Examples of anions useful in the present invention include without limitation $PO_3^{2-}$, $SO_3^-$, $COO^-$, $I^-$, $CH_3COO^-$, and the like. Examples of cations useful in the present invention include without limitation metal ions such as $Na^+$, $K^+$, $Li^+$, $Mg^{+2}$, $Zn^{+2}$, $Al^{+3}$, and the like, or organic ions such as $H^+$, $NH_3^+$, $CH_3(—CH_2—)_nO^+$, wherein n is an integer from 1 to 50, and the like.

In Formula 2, C serves as a linker connecting a conducting polymer to a main chain and is selected from the group consisting of —O—, —S—, —NH—, substituted or unsubstituted C1-C30 alkylene, substituted or unsubstituted C1-C30 heteroalkylene, substituted or unsubstituted C6-C30 arylene, substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C6-C30 arylamine, substituted or unsubstituted C6-C30 pyrrole, substituted or unsubstituted C6-C30 thiophene, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester and substituted or unsubstituted C2-C30 heteroaryl ester.

In Formula 2, D represents a monomer of the conducting polymer and may be substituted or unsubstituted aniline represented by Formula 3 below, substituted or unsubstituted pyrrole/substituted or unsubstituted thiophene represented by Formula 4 below, or copolymers thereof. In particular, where D is pyrrole or thiophene, substituents are advantageously present at positions 3 and 4, as shown in Formula 4 below:

(Formula 3)

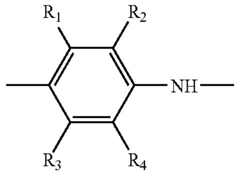

(Formula 4)

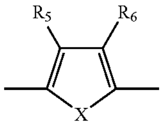

In formula 4, X may be NH, N to which a C1-C20 alkyl or C6-C20 aryl substituent is attached, or a heteroatom such as O, S or P. $R_1$, $R_2$, $R_3$ and $R_4$ can be independently selected from the group consisting of hydrogen, substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C6-C30 arylamine, substituted or unsubstituted C6-C30 pyrrole, substituted or unsubstituted C6-C30 thiophene, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester and substituted or unsubstituted C2-C30 heteroaryl ester.

When D is pyrrole or thiophene and no substituent is present at positions 3 and 4, polymerization may occur at positions 3 and 4. $R_5$ and $R_6$ are advantageously substituents other than hydrogen to prevent polymerization at positions 3 and 4. Accordingly, in the present invention, the substituents present on $R_5$ and $R_6$ are selected from the group consisting of NH; N to which a C1-C20 alkyl or C6-C20 aryl substituent is attached; O; S; hydrocarbon; substituted or unsubstituted C1-C30 alkyl, substituted or unsubstituted C6-C30 aryl, substituted or unsubstituted C1-C30 alkoxy, substituted or unsubstituted C1-C30 heteroalkyl, substituted or unsubstituted C1-C30 heteroalkoxy, substituted or unsubstituted C6-C30 arylalkyl, substituted or unsubstituted C6-C30 aryloxy, substituted or unsubstituted C6-C30 arylamine, substituted or unsubstituted C6-C30 pyrrole, substituted or unsubstituted C6-C30 thiophene, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, substituted or unsubstituted C2-C30 heteroaryl ester and any combination thereof.

D may be a structure in which $R_5$ connects with $R_6$ to form a ring, as shown in Formula 5 below.

(Formula 5)

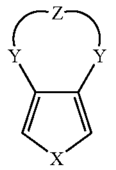

wherein X is NH, N to which a C1-C20 alkyl or C6-C20 aryl substituent is attached, or a heteroatom such as O, S or P;

Y is NH, N to which a C1-C20 alkyl or C6-C20 aryl substituent is attached, O, S, or hydrocarbon;

Z is $-(CH_2)_x-CR_7R_8-(CH_2)_y-$, wherein $R_7$ and $R_8$ are independently H, a substituted or unsubstituted C1-C20 alkyl radical, a C6-C14 aryl radical or $-CH_2-OR_9$ wherein $R_9$ is H or C1-C6 alkanoic acid, C1-C6 alkyl ester, C1-C6 heteroalkanoic acid or C1-C6 alkylsulfonic acid, and x and y are independently integers from 0 to 9.

In Formula 2, m, n and a represent mole fractions of the respective monomers, and m is greater than 0 and equal to or smaller than about 10,000,000, n is equal to or greater than 0 and smaller than about 10,000,000, a/n is greater than 0 and smaller than about 1. Herein, in connection with a repeat unit D which is a monomer of the conducting polymer, a/n can be equal to or greater than about 0.0001 and smaller than about 0.8, i.e., about $0.0001 \leqq a/n < $ about 0.8, and as another example, about $0.01 \leqq a/n \leqq$ about 0.5, to provide desired solubility and conductivity necessary for the opto-electronic device. In addition, a is an integer from 3 to 100, for example from 4 to 15.

The graft copolymer of the conducting polymer in accordance with the present invention is not particularly limited so long as it is a polymer represented by Formula 2 above, and can include a polyaniline graft copolymer PSS-g-PANI represented by Formula 6 below or a poly-3,4-ethylenedioxypyrrole graft copolymer PSS-g-PEDOP represented by Formula 7 below:

(Formula 6)

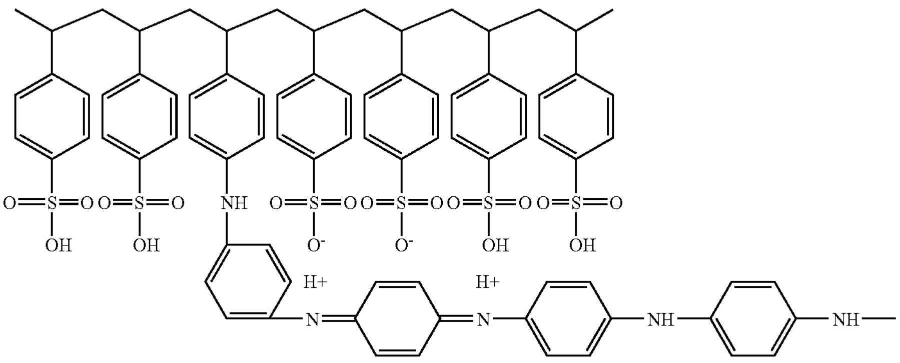

-continued (Formula 7)

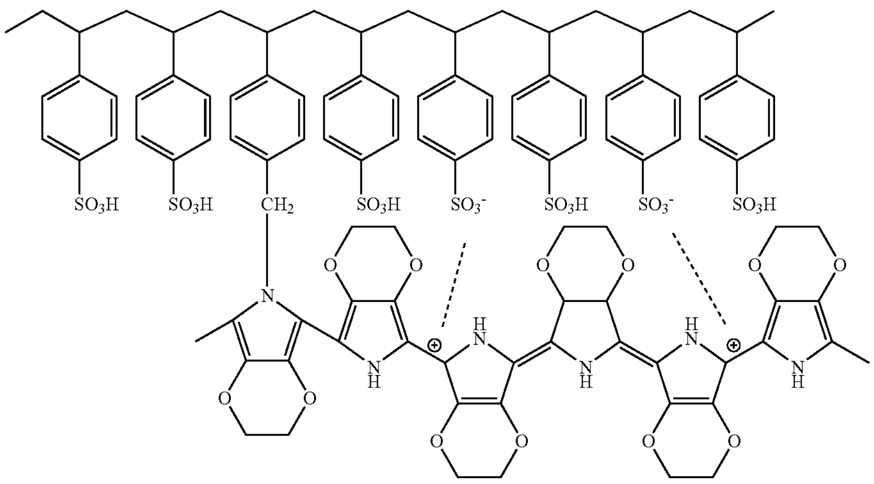

The graft copolymer of the conducting polymer in accordance with the present invention is stable due to a lower content of residues that are degradable by reactions with electrons, and does not exhibit dedoping because the conducting polymer and polyacid are connected to each other via chemical binding.

Examples of alkyl substituent groups useful in the present invention which may be linear or branched include without limitation methyl, ethyl, propyl, isobutyl, sec-butyl, tert-butyl, pentyl, iso-amyl and hexyl, and one or more hydrogen atoms contained in alkyl may be substituted with one or more of a halogen atom, hydroxyl, nitro, cyano, amino (for example, —$NH_2$, —NH(R) and —N(R')(R"), R' and R" being independently C1-C10 alkyl), amidino, hydrazine or hydrazone, and combinations thereof.

The term "heteroalkyl" as a substituent is used herein to refer to alkyl in which one or more carbon atoms present in the main chain of alkyl, for example one to five carbon atoms, are substituted with heteroatoms such as oxygen, sulfur, nitrogen and phosphorous atoms, and the like, and combinations thereof.

As used herein, the term "aryl" as a substituent refers to a carbocyclic aromatic system containing one or more aromatic rings, wherein such rings may be attached together in a pendent manner or may be fused. Specific examples of aryl may include without limitation aromatic groups such as phenyl, naphthyl and tetrahydronaphthyl, and one or more hydrogen atoms contained in aryl may be substituted with the same substituents as those discussed above for alkyl.

As used herein, the term "heteroaryl" as a substituent refers to a 5 to 30-membered cyclic aromatic system containing one, two or three heteroatoms selected from N, O, P and S, with the remaining ring atoms being carbon atoms, wherein such rings may be attached together in a pendent manner or may be fused. In addition, one or more hydrogen atoms in heteroaryl may be substituted with the same substituents as those discussed above for alkyl.

As used herein, the term "alkoxy" as a substituent refers to an —O-alkyl radical, wherein alkyl is as defined above. Specific examples of alkoxy may include without limitation methoxy, ethoxy, propoxy, isobutyloxy, sec-butyloxy, pentyloxy, iso-amyloxy and hexyloxy, and one or more hydrogen atoms present in alkoxy may be substituted with the same substituents as those discussed above for alkyl.

As used herein, the term "arylalkyl" as a substituent refers to alkyl in which a portion of hydrogen atoms in aryl as defined above is substituted with lower alkyl radicals such as methyl, ethyl and propyl. For example, mention may be made of benzyl and phenylethyl. One or more hydrogen atoms present in arylalkyl may be substituted with the same substituents as those discussed above for alkyl.

As used herein, the term "heteroarylalkyl" as a substituent refers to alkyl in which a portion of hydrogen atoms in heteroaryl is substituted with lower alkyl and the heteroaryl is as defined above. One or more hydrogen atoms in heteroarylalkyl may be substituted with the same substituents as those discussed above for alkyl.

As used herein, the term "aryloxy" as a substituent refers to an —O-aryl radical wherein aryl is as defined above. Examples of aryloxy include without limitation phenoxy, naphthoxy, anthracenyloxy, phenanthrenyloxy, fluorenyloxy and indenyloxy. Herein, one or more hydrogen atoms present in aryloxy may be substituted with the same substituents as those discussed above for alkyl.

As used herein, the term "heteroaryloxy" as a substituent refers to an —O-heteroaryl radical wherein heteroaryl is as defined above. Examples of heteroaryloxy as used herein include without limitation benzyloxy and phenylethyloxy, and one or more hydrogen atoms therein may be substituted with the same substituents as those discussed above for alkyl.

As used herein, the term "cycloalkyl" as a substituent refers to a monovalent monocyclic system containing 5 to 30 carbon atoms. At least one hydrogen atom present in cycloalkyl may be substituted with the same substituents as those discussed above for alkyl.

As used herein, the term "heterocycloalkyl" as a substituent refers to a 5 to 30-membered monovalent monocyclic system containing one, two or three heteroatoms selected from N, O, P and S, and combinations thereof, with the remaining ring atoms being carbon atoms. One or more hydrogen atoms present in cycloalkyl may be substituted with the same substituents as those discussed above for alkyl.

As used herein, the term "amino" as a substituent refers to —$NH_2$, —NH(R) or —N(R')(R"), wherein R' and R" are independently C1-C10 alkyl.

Examples of halogen that can be used in the present invention can include without limitation fluorine, chlorine, bromine, iodine, astatine, and combinations thereof.

The present invention provides a conducting polymer film composition comprising a graft copolymer of the self-doped conducting polymer and a solvent, which can be used in an organic opto-electric device. Examples of solvent useful in the invention include without limitation water and polar organic solvents, although there is no particular limit to the solvent to be used so long as it can dissolve the graft copolymer of the conducting polymer. Examples of polar organic solvents useful in the invention include without limitation alcohols, dimethylformamide (DMF), dimethylsulfoxide, toluene, xylene, chlorobenzene, and the like, and combinations thereof.

In the conducting polymer film composition according to the present invention, because the graft copolymer of the conducting polymer can be used by dissolving it in the solvent, opto-electric devices using the above graft copolymer can exhibit prolonged life-time. In addition, the graft copolymer of the conducting polymer according to the present invention is particularly highly soluble in polar organic solvents. Therefore, application thereof to the opto-electric device can prevent damage of the film in relation to an adjacent organic film, for example the light-emitting layer which is dissolved in non-polar solvents for use in the cases of organic electroluminescent devices, and can also be particularly useful in the case where water cannot be used.

The conducting polymer film composition according to the present invention can include the graft copolymer of the conducting polymer in an amount ranging from about 0.5 to about 10% by weight, and can include the solvent in an amount ranging from about 90 to about 99.5% by weight.

Meanwhile, in order to further improve the crosslinkability of the graft copolymer of the conducting polymer, the conducting polymer film composition according to the present invention may further contain a crosslinking agent. The crosslinking agent may be a physical crosslinking agent or a chemical crosslinking agent, or a mixture thereof.

As used herein, the physical crosslinking agent serves to physically crosslink between polymer chains without any chemical bond and refers to a low- or high molecular weight compound containing hydroxyl group (—OH). Specific examples of the physical crosslinking agent include without limitation low-molecular weight compounds such as glycerol and butanol, and high-molecular weight compounds such as polyvinyl alcohol and polyethyleneglycol. In addition, polyethyleneimine, polyvinylpyrolidone and the like may also be employed as the physical crosslinking agent.

As used herein, the conducting polymer film composition can include the physical crosslinking agent in an amount ranging from about 0.001 to about 5 parts by weight, for example about 0.1 to about 3 parts by weight, relative to 100 parts by weight of the graft copolymer of the conducting polymer. Meanwhile, the chemical crosslinking agent serves to chemically crosslink between polymer chains and refers to a chemical compound capable of performing in-situ polymerization and forming an interpenetrating polymer network (IPN). Silane-based materials are primarily used as the chemical crosslinking agent and a specific example thereof includes tetraethyloxysilane (TEOS). In addition, polyaziridine, melamine-based materials, epoxy-based materials and any combination thereof may be employed as the chemical crosslinking agent.

As used herein, the conducting polymer film composition can include the chemical crosslinking agent in an amount ranging from about 0.001 to about 50 parts by weight, for example about 1 to about 10 parts by weight, relative to 100 parts by weight of the graft copolymer of the conducting polymer.

Further, the present invention also provides a conducting polymer film comprising the above-mentioned conducting polymer film composition and an organic opto-electronic device comprising the same.

As such, the conducting polymer film composition in accordance with the present invention can be employed in the organic opto-electronic device, thereby improving the lifetime and efficiency characteristics of the device. Examples of the organic opto-electronic devices to which the conducting polymer film composition in accordance with the present invention can be applied include without limitation organic electroluminescent devices, organic solar cells, organic transistors and organic memory devices.

In particular, in organic electroluminescent devices, the conducting polymer composition can be used in an electric charge-injection layer, i.e., hole or electron-injection layer, and is thereby capable of achieving balanced and efficient injection of holes and electrons into light-emitting polymers which in turn serves to enhance the luminescence intensity and efficiency of the organic electroluminescent devices.

In addition, the conducting polymer film composition of the present invention may also be used as an electrode or an electrode buffer layer in organic solar cells, thereby increasing quantum efficiency, while it may be used as an electrode material for gates, source-drain electrodes and the like in organic transistors.

Among the organic opto-electronic devices as discussed above, the structure of an exemplary organic electroluminescent device using the conducting polymer film composition of the present invention and an exemplary fabricating method thereof will be illustrated hereinafter.

First, FIGS. 1 through 4 are cross-sectional views schematically showing a stack structure of an organic electroluminescent device prepared in accordance with the Examples of the present invention.

Referring now to the organic electroluminescent device of FIG. 1, a light-emitting layer 12 is stacked on an upper part of a first electrode 10, an hole-injection layer (HIL) (or also referred to as "buffer layer") 11 containing a conducting polymer composition of the present invention is stacked between the first electrode 10 and light-emitting layer 12, a hole-blocking layer (HBL) 13 is stacked on the upper part of the light-emitting layer 12, and a second electrode 14 is formed on the upper part of the hole-blocking layer (HBL) 13.

Figure 2:
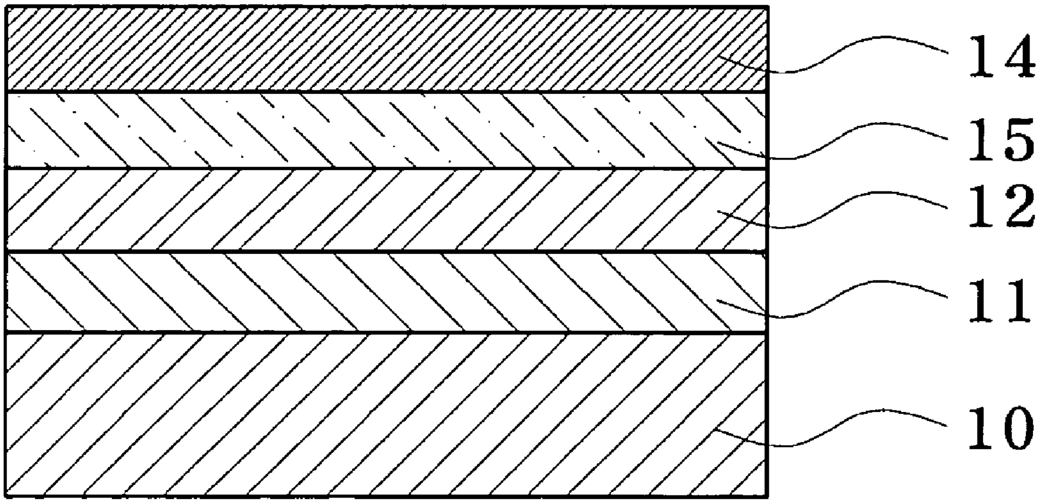

An organic electroluminescent device of FIG. 2 has the same stacked structure as in FIG. 1, except that an electron-transport layer (ETL) 15 is formed on the upper part of the light-emitting layer 12, instead of the hole-blocking layer (HBL) 13.

Figure 3:
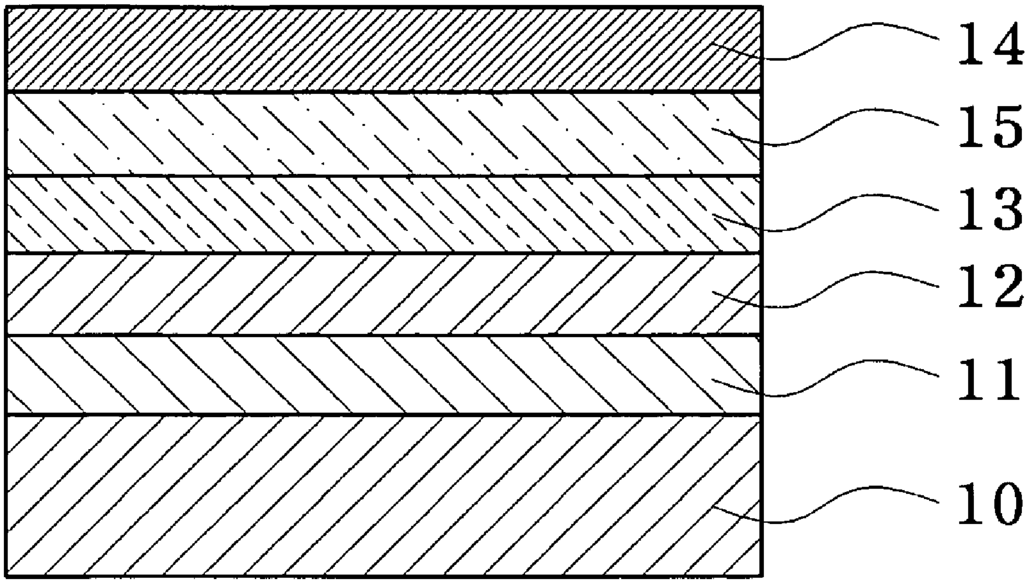

An organic electroluminescent device of FIG. 3 has the same stacked structure as in FIG. 1, except that a bilayer having the hole-blocking layer (HBL) 13 and electron-transport layer (ETL) 15 sequentially stacked therein is used, instead of the hole-blocking layer (HBL) 13 formed on the upper part of the light-emitting layer 12.

Figure 4:
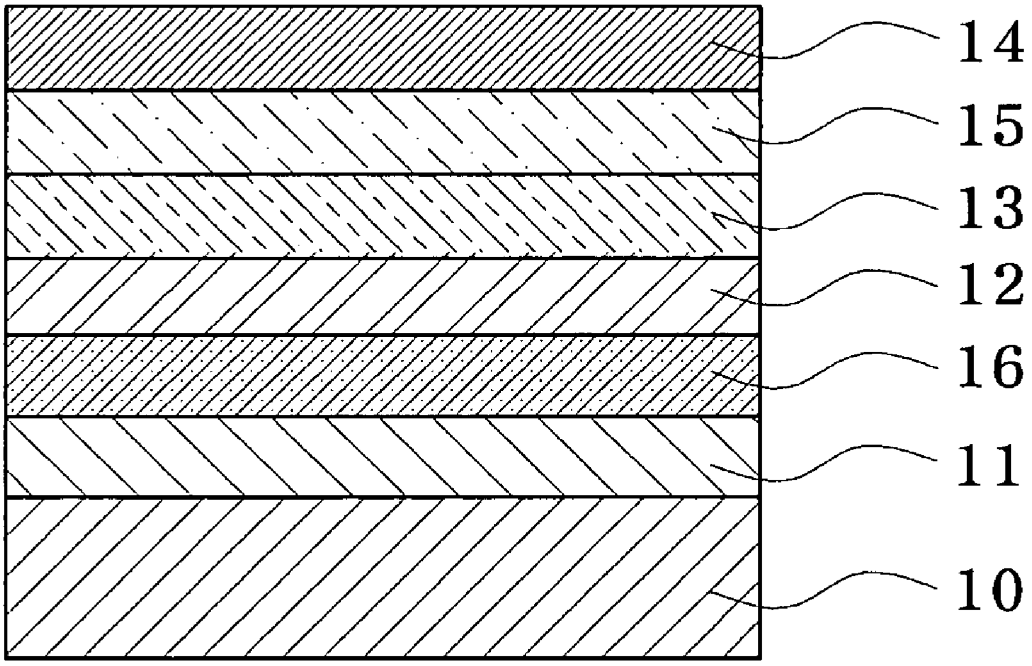
Figure 5:
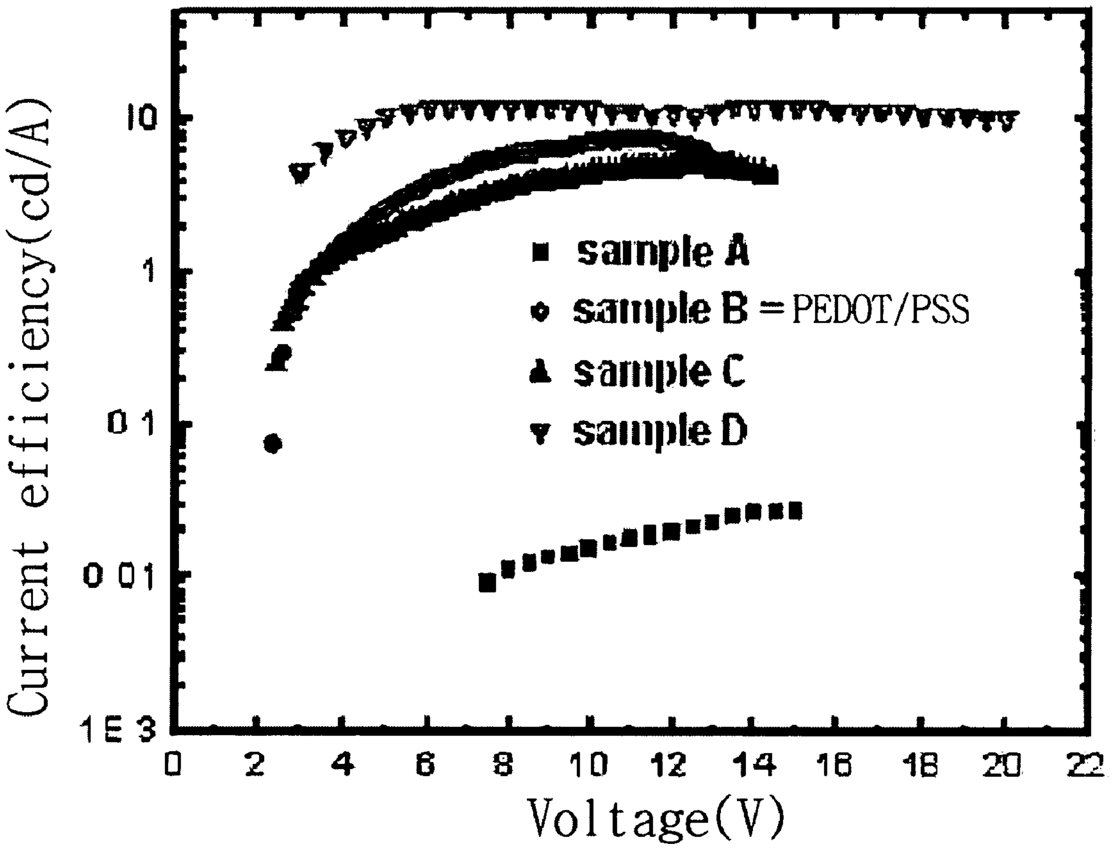
FIG. 5 is a graph showing the efficiency characteristics of organic electroluminescent devices prepared in Examples of the present invention and Comparative Examples.

An organic electroluminescent device of FIG. 4 has the same stacked structure as in FIG. 3, except that a hole-transport layer 16 is further formed between the hole-injection layer 11 and light-emitting layer 12. The hole-transport layer 16 serves to block the penetration of impurities from the hole-injection layer 11 to the light-emitting layer 12.

The organic electroluminescent devices having stacked structures of FIGS. 1 through 4 can be made by conventional manufacturing methods known in the art.

For example, a patterned first electrode 10 can be first formed on an upper part of a substrate (not shown). Any substrate used in conventional organic electroluminescent devices may be employed. Examples include glass or transparent plastic substrates having excellent transparency, surface smoothness, handleability and water proof properties. The thickness of the substrate can range from about 0.3 to about 1.1 mm.

Materials for use in formation of the first electrode 10 are not particularly limited. If the first electrode 10 is a cathode, the cathode can be made of a conducting metal capable of easily injecting holes or an oxide thereof. Specific examples of such materials include without limitation indium tin oxide (ITO), indium zinc oxide (IZO), nickel (Ni), platinum (Pt), gold (Au) and iridium (Ir).

The substrate on which the first electrode 10 is formed can be washed, followed by UV and ozone treatment. Washing can be carried out using organic solvents such as isopropanol (IPA) and acetone.

A hole-injection layer 11 containing a conducting polymer composition of the present invention is formed on the upper part of the first electrode 10 of the washed substrate. Formation of the hole-injection layer 11 can reduce contact resistance between the first electrode 10 and light-emitting layer 12 and at the same time, improve hole-transporting ability of the first electrode 10 to the light-emitting layer 12. Thus it is possible to improve the operating voltage and life-time of the device.

The hole-injection layer 11 may be formed by spin coating a composition for formation of the hole-injection layer, which can be prepared by dissolving the graft copolymer of the conducting polymer of the present invention in a solvent, on the upper part of the first electrode 10, followed by drying. The composition for the formation of the hole-injection layer can be prepared by dissolving the graft copolymer including the conducting polymer in a weight ratio ranging from about 1:1 to about 1:30, based on the total weight of the graft copolymer, in water or an alcohol to a solid content of about 0.5 to about 10% by weight.

There is no particular limit to the solvent that can be utilized in the present invention so long as it can dissolve the conducting polymer composition in accordance with the present invention. Specific examples of the solvent include without limitation water, alcohol, dimethylformamide (DMF), dimethylsulfoxide, toluene, xylene, chlorobenzene, and the like, and combinations thereof.

The thickness of the hole-injection layer 11 may be in the range of about 5 to about 200 nm, for example about 20 to about 100 nm, and as another example about 50 nm.

Next, the light-emitting layer 12 is formed on the upper part of the hole-injection layer 11. There is no particular limit to materials constituting the light-emitting layer. Examples of materials useful for forming the light-emitting layer are known in the art and include without limitation oxadiazole dimer dyes (such as Bis-DAPOXP)), spiro compounds (such as Spiro-DPVBi, Spiro-6P), triarylamine compounds, bis (styryl)amine (such as DPVBi, DSA), Flrpic, CzTT, anthracene, TPB, PPCP, DST, TPA, OXD-4, BBOT and AZM-Zn (blue emitting); Coumarin 6, C545T, Quinacridone and $Ir(ppy)_3$ (green emitting); and DCM1, DCM2, Eu (thenoyltrifluoroacetone)3 [(Eu (TTA)3) and butyl-6-(1,1,7, 7-tetramethyljulolidyl-9-enyl)-4H-pyran (DCJTB) (red emitting). In addition, polymeric luminescent materials include, but are not limited to, phenylene, phenylene vinylene, thiophene, fluorene and spiro-fluorene based polymers and nitrogen-containing aromatic compounds.

The thickness of the light-emitting layer 12 can range from about 10 to about 500 nm, for example about 50 to about 120 nm. As another example, the light emitting layer can be a blue-emitting layer with a thickness of about 70 nm. If the thickness of the light-emitting layer is less than about 10 nm, this may lead to an increase in leakage current, thereby reducing efficiency and life-time of the device. In contrast, if the thickness of the layer exceeds about 500 nm, an increase of the operating voltage becomes undesirably high.

If necessary, a dopant may be further added to the composition for the formation of the light-emitting layer. The content of the dopant may vary depending upon materials used in the formation of the light-emitting layer, and range from about 30 to about 80 parts by weight, based on 100 parts by weight of the light-emitting layer-forming material (the total weight of host and dopant). If the content of the dopant is outside the above range, this can undesirably lead to deteriorated luminous characteristics of the EL device. Specific examples of the dopant may include without limitation arylamines, peryl compounds, pyrrole compounds, hydrazone compounds, carbarzole compounds, stilbene compounds, starburst compounds, oxadiazole compounds, and the like, and combinations thereof.

In addition, a hole-transport layer 16 may be optionally formed between the hole-injection layer 11 and light-emitting layer 12.

Although there is no particular limit to materials constituting a hole-transport layer, examples of such materials may include without limitation at least one material selected from the group consisting of a compound having a carbazole group and/or an arylamine group capable of exerting hole-transportation, a phthalocyanine compound and triphenylene derivative. More specifically, the hole-transport layer may be made up of at least one material selected from the group consisting of 1,3,5-tricarbazolylbenzene, 4,4'-biscarbazolylbiphenyl, polyvinyl carbazole, m-biscarbazolylphenyl, 4,4'-biscarbazolyl-2,2'-dimethylbiphenyl, 4,4',4"-tri(N-carbazolyl)triphenylamine, 1,3,5-tri(2-carbazolylphenyl)benzene, 1,3,5-tris (2-carbazolyl-5-methoxyphenyl)benzene, bis(4-carbazolylphenyl)silane, N,N'-bis(3-methylphenyl)-N,N'-diphenyl-[1,1-biphenyl]-4,4'-diamine(TPD), N,N'-di (naphthalen-1-yl)-N,N'-diphenyl benzidine (α-NPD), N,N'-diphenyl-N,N'-bis(1-naphthyl)-(1,1'-biphenyl)-4,4'-diamine (NPB), IDE320 (Idemitsu), poly(9,9-dioctylfluorene-co-N-(4-butylphenyl)diphenylamine)(poly(9,9-dioctylfluorene-co-N-(4-butylphenyl)diphenylamine) (TFB) and poly(9,9-dioctylfluorene-co-bis-(4-butylphenyl)-bis-N,N-phenyl-1,4-phenylenediamine) (PFB), and the like, and combinations thereof, without being limited thereto.

The hole-transport layer may have a thickness of about 1 to about 100 nm, for example about 5 to about 50 nm, and as another example a thickness of less than about 30 nm. Where the thickness of the hole-transport layer is less than about 1 nm, it can be too thin and thus may lead to deterioration in hole-transporting ability thereof. In contrast, where the thickness of the hole-transport layer exceeds about 100 nm, this may result in an increased operating voltage.

Next, the hole-blocking layer 13 and/or electron-transport layer 15 can be formed on the upper part of the light-emitting layer 12 via deposition or spin coating. The hole-blocking layer 13 can serve to block the migration of excitons generated from luminous material into the electron-transport layer 15 or to block the migration of holes into the electron-transport layer 15.

Materials that can be used for formation of the hole-blocking layer 13 include without limitation phenanthroline compounds (for example BCP, available from UDC), imidazole compounds, triazole compounds, oxadiazole compounds (for example, PBD), aluminum complexes (available from UDC) and BAlq, and the like, and combinations thereof.

Materials that can be used for formation of the electron-transport layer 15 include without limitation oxazole compounds, isoxazole compounds, triazole compounds, isothiazole compounds, oxadiazole compounds, thiadiazole compounds, perylene compounds, aluminum complexes (for example, Alq3 (tris(8-quinolinolato)aluminum), BAlq, SAlq and Almq3), gallium complexes (for example, Gaq'2OPiv, Gaq'2OAc and 2(Gaq'2)), and the like, and combinations thereof.

The thickness of the hole-blocking layer can range from about 5 to about 100 nm, and the thickness of the electron-transport layer can range from about 5 to about 100 nm. If the thicknesses of the hole-blocking layer and electron-transport layer are outside the above ranges, it can be undesirable in terms of electron-transporting ability or hole-blocking ability.

Then, a second electrode 14 can be formed on the resulting structure, followed by sealing to prepare an organic electroluminescent device.

Although materials for use in formation of the second electrode 14 are not particularly limited, the electrode can be formed using metals having a relatively low work function such as Li, Cs, Ba, Ca, Ca/Al, LiF/Ca, LiF/Al, $BaF_2$/Ca, Mg, Ag, Al or alloys or multi-layers thereof. The thickness of the second electrode 14 can range from about 50 to about 3000 Å.

Example 1

Preparation of Self-doped Polyaniline Graft Copolymer 0.2 g of aniline, purchased from Sigma Aldrich, is dissolved in 30 ml of an aqueous hydrochloric acid solution in which 0.8 g of a random copolymer P(SSA-co-AMS) represented by Formula 8 below is dissolved, at 0° C. for 30 min, followed by polymerization using 0.49 g of ammonium persulfate as an oxidizing agent. At this time, an aqueous solution of 0.1 to 2M hydrochloric acid can be used. An equivalent ratio of the oxidizing agent:aniline may be within a range of 1:1 to 2:1. 6 hours later, a dark green aqueous solution is obtained. After completion of polymerization, a mixed solvent of acetonitrile/water (8:2) is added to the resulting mixed solution, thereby precipitating a polyaniline graft copolymer PSS-g-PANI represented by Formula 6 below. Then, the thus obtained copolymer is completely dried in a vacuum oven at 30° C. for 24 hours:

(Formula 8)

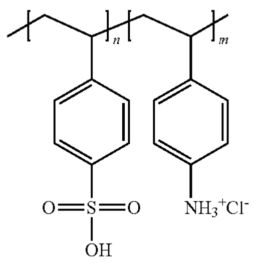

(Formula 6)

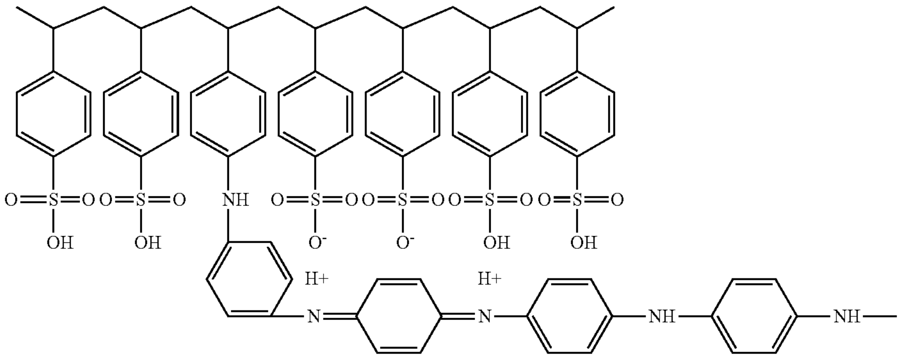

Example 2

Preparation of Self-doped Polyaniline Copolymer (Changes in Grafting Length)

An aniline grafting reaction is carried out as follows. A reaction temperature is lowered to 0° C. and an amount of aniline+PSSA-co-AMS is adjusted to 1 g while varying a molar ratio of aniline/PSSA-co-AMS in a range of 100 to 0.1. Then, 1 g of aniline+PSSA-co-AMS thus obtained is dissolved in 30 ml of an aqueous hydrochloric acid solution for 30 min and the resulting solution is subjected to polymerization using ammonium persulfate as an oxidizing agent. Herein, an equivalent ratio of the oxidizing agent:aniline is adjusted to 1:1. After completion of polymerization, a mixed solvent of acetonitrile/water (8:2) is added to the resulting mixed solution, thereby precipitating a polyaniline graft copolymer PSS-g-PANI represented by Formula 6 above.

The number of aniline residues in the thus obtained graft copolymer ranges from 1 to 400 aniline residues on average, depending upon experimental conditions. The thus obtained copolymer is thoroughly dried in a vacuum oven at 30° C. for 24 hours.

Example 3

Preparation of Self-doped Poly-3,4-ethylenedioxypyrrole Graft Copolymer

Using 3,4-ethylenedioxypyrrole (EDOP, Sigma Aldrich) represented by Formula 9 below, a random copolymer P(SSA-co-EDOP) represented by Formula 10 below is synthesized via a known method (see Macromolecules, 2005, 48, 1044-1047). 0.2 g of EDOP is added dropwise to 30 ml of an aqueous hydrochloric acid solution in which 0.8 g of a random copolymer P(SSA-co-EDOP) is dissolved, at 0° C. for 30 min, followed by polymerization using 0.49 g of ammonium persulfate as an oxidizing agent. At this time, an aqueous solution of 0.1 to 2M hydrochloric acid can be added. An equivalent ratio of the oxidizing agent:aniline may be within a range of 1:1 to 2:1. 6 hours later, a dark blue aqueous solution is obtained. After completion of polymerization, a mixed solvent of acetonitrile/water (8:2) is added to the resulting mixed solution, thereby precipitating a polypyrrole graft copolymer PSS-g-PEDOP represented by Formula 7 below. Then, the thus obtained copolymer is completely dried in a vacuum oven at 30° C. for 24 hours:

(Formula 9)

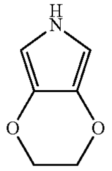

(Formula 10)

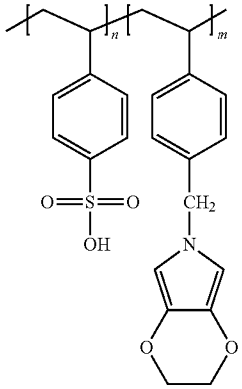

(Formula 7)

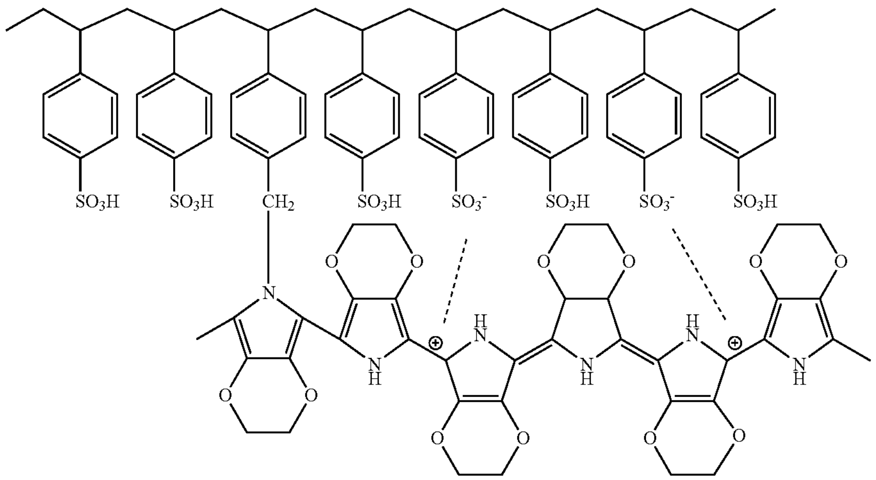

Example 4

Preparation of Conducting Polymer Film Composition (1)

1.5% by weight of a polyaniline graft copolymer PSS-g-PANI prepared in Example 1 is dissolved in 98.5% by weight of a solvent (e.g. alcohol), thereby preparing a conducting polymer film composition in accordance with the present invention.

Example 5

Preparation of Conducting Polymer Film Composition (2)

A conducting polymer film composition is prepared in the same manner as in Example 4, except that a polyaniline graft copolymer having a different aniline ratio, prepared in Example 2, is used.

Example 6

Preparation of Conducting Polymer Film Composition (3)

A conducting polymer film composition is prepared in the same manner as in Example 4, except that a self-doped poly-3,4-ethylenedioxypyrrole graft copolymer prepared in Example 3 is used.

Example 7

Fabrication of Organic Electroluminescent Device (1)

Corning 15 Ω/$cm^2$ (1200 Å) IZO glass substrate is cut into a size of 50 mm×50 mm×0.7 mm, and is subjected to ultrasonic cleaning in isopropyl alcohol and pure water, for 5 min, respectively, followed by UV/ozone cleaning for 30 min.

A conducting polymer film composition prepared in Example 4 is spin coated on the upper part of the substrate, thereby forming a hole-injection layer having a thickness of 50 nm. PFB (a hole-transporting material, a product available from Dow Chemical) is spin coated on the upper part of the hole-injection layer, thereby forming a hole-transport layer having a thickness of 10 nm.

Using a spirofluorene-based luminescent polymer as a blue-emitting material, a light-emitting layer having a thickness of 70 nm is formed on the upper part of the hole-transport layer, and then $BaF_2$ is deposited on the upper part of the light-emitting layer, thereby forming an electron-injection layer having a thickness of 4 nm. As a second electrode, calcium (Ca) and aluminum (Al) are respectively deposited to thicknesses of 2.7 nm and 250 nm on the upper part of the electron-injection layer, thereby fabricating an organic electroluminescent device (hereinafter, referred to as sample C).

Example 8

Fabrication of Organic Electroluminescent Device (2)

An organic electroluminescent device (hereinafter, referred to as sample D) is fabricated in the same manner as in Example 7, except that a conducting polymer film composition having a different aniline ratio, prepared in Example 5, is used as a material for formation of a hole-injection layer.

Comparative Example 1

Fabrication of Organic Electroluminescent Device

An organic electroluminescent device (hereinafter, referred to as sample A) is fabricated in the same manner as in Example 7, except that a hole-injection layer is not formed.

Comparative Example 2

Fabrication of Organic Electroluminescent Device

An organic electroluminescent device (hereinafter, referred to as sample B) is fabricated in the same manner as in Example 7, except that an aqueous solution of PEDOT/PSS (Baytron-P 4083, Bayer) is used as a material for formation of a hole-injection layer.

Experimental Example 1

Evaluation of Efficiency Properties

Luminous efficiency of the respective samples A, B, C and D fabricated in Examples 7 and 8 and Comparative Examples 1 and 2 is measured using a SpectraScan PR650 spectroradiometer.

Samples A, B, C and D exhibited efficiency of 0.06 cd/A, 7 cd/A, 6 cd/A and 10 cd/A, respectively. Consequently, the organic electroluminescent device in accordance with the present invention can achieve about a 40% higher efficiency.

Therefore, it can be seen that the organic electroluminescent device including the hole-injection layer formed of the conducting polymer film composition in accordance with the present invention can exhibit excellent luminous efficiency.

As apparent from the above description, the graft copolymer of the conducting polymer contained in the conducting polymer film composition in accordance with the present invention has a lower content of residues that are decomposed by reactions with electrons. In addition, the graft copolymer of the conducting polymer contained in the conducting polymer film composition in accordance with the present invention is soluble in polar organic solvents as well as water. Therefore, the conducting polymer film comprising the composition in accordance with the present invention can maintain stable morphology thereof in relation to adjacent films and does not cause problems such as exciton quenching.

Additionally, in the graft copolymer of the conducting polymer contained in the conducting polymer film composition in accordance with the present invention, the conducting polymer and polyacid are connected to each other via chemical binding. Therefore, application of such a graft copolymer to the organic opto-electronic device does not exhibit dedoping upon operating the device, due to excellent thermal stability thereof. As a result, the organic opto-electronic device including the graft copolymer of the conducting polymer is stable and highly efficient.

Further, with the graft copolymer of the conducting polymer contained in the conducting polymer film composition in accordance with the present invention, it is possible to control the ratio of the conducting polymer as desired and thus it is possible to control conductivity and work function of the polymer film applied to the organic opto-electronic device.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A conducting polymer film composition useful for an organic opto-electronic device, comprising a conducting polymer and a solvent, wherein the composition comprises a graft copolymer of a self-doped conducting polymer represented by Formula 2 below:

(Formula 2)

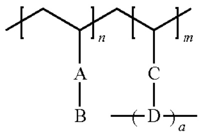

wherein A is selected from the group consisting of substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, and substituted or unsubstituted C2-C30 heteroaryl ester;

B represents an ionic group or an ionic group-containing group, wherein the ionic group is a conjugate of an anion and a cation;

C is selected from the group consisting of —O—, —S—, —NH—, substituted or unsubstituted C1-C30 alkylene, substituted or unsubstituted C1-C30 heteroalkylene, substituted or unsubstituted C6-C30 arylene, substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C6-C30 arylamine, substituted or unsubstituted C6-C30 pyrrole, substituted or unsubstituted C6-C30 thiophene, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, and substituted or unsubstituted C2-C30 heteroaryl ester;

D is pyrrole or thiophene represented by Formula 4 below and having substituents other than hydrogen at positions 3 and 4:

(Formula 4)

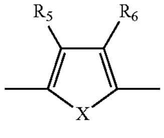

wherein X is NH, N to which a C1-C20 alkyl or C6-C20 aryl substituent is attached, or a heteroatom, and $R_5$ and $R_6$ are independently selected from the group consisting of NH; N to which a C1-C20 alkyl or C6-C20 aryl substituent is attached; O; S; hydrocarbon; substituted or unsubstituted C1-C30 alkyl, substituted or unsubstituted C6-C30 aryl, substituted or unsubstituted C1-C30 alkoxy, substituted or unsubstituted C1-C30 heteroalkyl, substituted or unsubstituted C1-C30 heteroalkoxy, substituted or unsubstituted C6-C30 arylalkyl, substituted or unsubstituted C6-C30 aryloxy, substituted or unsubstituted C6-C30 arylamine, substituted or unsubstituted C6-C30 pyrrole, substituted or unsubstituted C6-C30 thiophene, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, substituted or unsubstituted C2-C30 heteroaryl ester and any combination thereof; and m, n and a represent mole fractions of the respective monomers, and m is greater than 0 and equal to or smaller than about 10,000,000, n is equal to or greater than 0 and smaller than about 10,000,000, a/n is greater than 0 and smaller than about 1, and a is an integer from 3 to 100.

2. The composition according to claim 1, wherein B comprises an anion selected from the group consisting of $PO_3^{2-}$, $SO_3^-$, $COO^-$, $I^-$ and $CH_3COO^-$ and a cation selected from metal ions or organic ions.

3. The composition according to claim 2, wherein said cation comprises a metal ion selected from the group consisting of $Na^+$, $K^+$, $Li^+$, $Mg^{+2}$, $Zn^{+2}$ and $Al^{+3}$ or an organic ion selected from the group consisting of $H^+$, $NH_3^+$ and $CH_3(—CH_2—)_nO^+$, wherein n is an integer from 1 to 50.

4. The composition according to claim 1, wherein a is an integer from 4 to 15.

5. The composition according to claim 1, wherein a/n is equal to or greater than about 0.0001 and smaller than about 0.8.

6. The composition according to claim 1, wherein said heteroatom is selected from the group consisting of O, S and P.

7. A conducting polymer film composition useful for an organic opto-electronic device, comprising a conducting polymer and a solvent, wherein the composition comprises a graft copolymer of a self-doped conducting polymer represented by Formula 2 below:

(Formula 2)

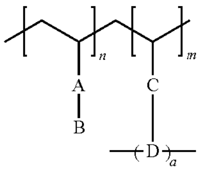

wherein A is selected from the group consisting of substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, and substituted or unsubstituted C2-C30 heteroaryl ester;

B represents an ionic group or an ionic group-containing group, wherein the ionic group is a conjugate of an anion and a cation;

C is selected from the group consisting of —O—, —S—, —NH—, substituted or unsubstituted C1-C30 alkylene, substituted or unsubstituted C1-C30 heteroalkylene, substituted or unsubstituted C6-C30 arylene, substituted or unsubstituted C1-C30 alkyl, substituted or unsubstituted C1-C30 heteroalkyl, substituted or unsubstituted C1-C30 alkoxy, substituted or unsubstituted C1-C30 heteroalkoxy, substituted or unsubstituted C6-C30 aryl, substituted or unsubstituted C6-C30 arylalkyl, substituted or unsubstituted C6-C30 aryloxy, substituted or unsubstituted C6-C30 arylamine, substituted or unsubstituted C6-C30 pyrrole, substituted or unsubstituted C6-C30 thiophene, substituted or unsubstituted C2-C30 heteroaryl, substituted or unsubstituted C2-C30 heteroarylalkyl, substituted or unsubstituted C2-C30 heteroaryloxy, substituted or unsubstituted C5-C20 cycloalkyl, substituted or unsubstituted C2-C30 heterocycloalkyl, substituted or unsubstituted C1-C30 alkyl ester, substituted or unsubstituted C1-C30 heteroalkyl ester, substituted or unsubstituted C6-C30 aryl ester, and substituted or unsubstituted C2-C30 heteroaryl ester;

D is a monomer represented by Formula 5 below:

(Formula 5)

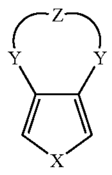

wherein X is NH, N to which a C1-C20 alkyl or C6-C20 aryl substituent is attached, or a heteroatom;

Y is NH, N to which a C1-C20 alkyl or C6-C20 aryl substituent is attached, O, S, or hydrocarbon;

Z is $—(CH_2)_x—CR_7R_8—(CH_2)_y$, wherein $R_7$ and $R_8$ are independently H, a substituted or unsubstituted C1-C20 alkyl radical, a C6-C14 aryl radical or $—CH_2—OR_9$ wherein $R_9$ is H or C1-C6 alkanoic acid, C1-C6 alkyl ester, C1-C6 heteroalkanoic acid or C1-C6 alkylsulfonic acid, and x and y are independently integers from 0 to 9; and m, n and a represent mole fractions of the respective monomers, and m is greater than 0 and equal to or smaller than about 10,000,000, n is equal to or greater than 0 and smaller than about 10,000,000, a/n is greater than 0 and smaller than about 1, and a is an integer from 3 to 100.

8. The composition according to claim 1, wherein the graft copolymer of the self-doped conducting polymer is a polyaniline graft copolymer PSS-g-PANI represented by Formula 6 below or a poly-3,4-ethylenedioxypyrrole graft copolymer PSS-g-PEDOP represented by Formula 7 below:

(Formula 6)

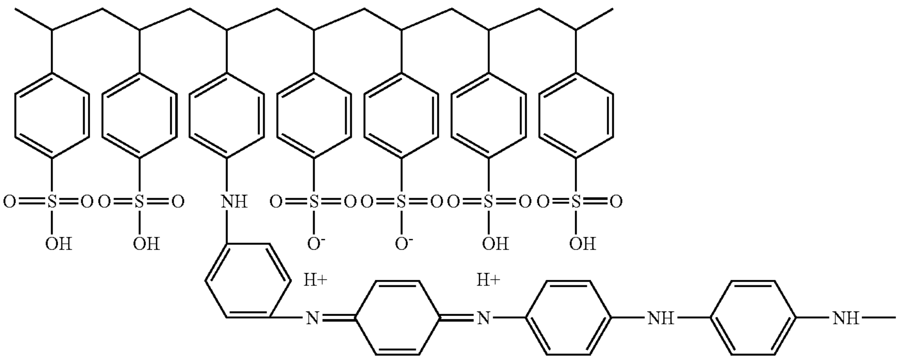

(Formula 7)

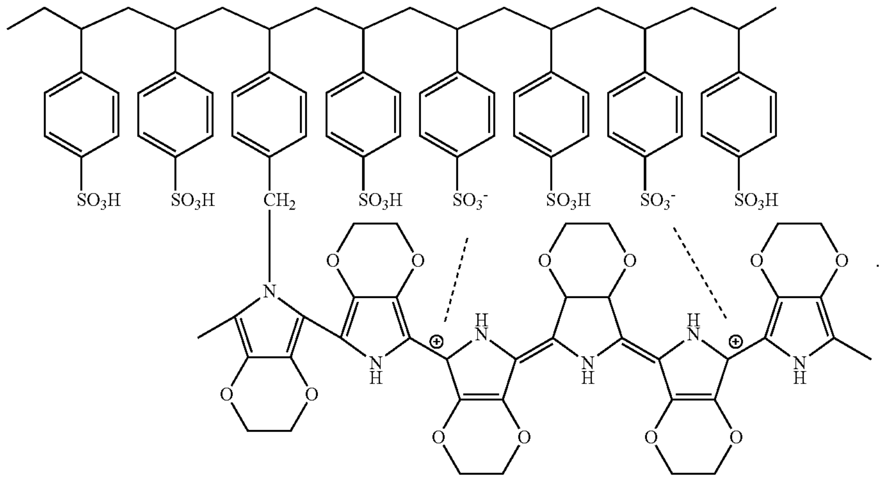

9. The composition according to claim 1, comprising the graft copolymer of the self-doped conducting polymer in an amount ranging from about 0.5 to about 10% by weight.

10. The composition according to claim 1, wherein the solvent is selected from the group consisting of water, alcohol, dimethylformamide (DMF), dimethylsulfoxide, toluene, xylene, chlorobenzene and any combination thereof.

11. The composition according to claim 1, further comprising a crosslinking agent.

12. The composition according to claim 11, wherein the crosslinking agent is a physical crosslinking agent, a chemical crosslinking agent or a combination thereof.

13. The composition according to claim 12, wherein the physical crosslinking agent is a compound selected from the group consisting of glycerol, butanol, polyvinyl alcohol, polyethyleneglycol, polyethyleneimine, polyvinylpyrolidone, and any combination thereof.

14. The composition according to claim 12, comprising the physical crosslinking agent in an amount ranging from about 0.001 to about 5 parts by weight, based on 100 parts by weight of the graft copolymer of the self-doped conducting polymer.

15. The composition according to claim 12, comprising the chemical crosslinking agent in an amount ranging from about 0.001 to about 50 parts by weight, based on 100 parts by weight of the graft copolymer of the self-doped conducting polymer.

16. The composition according to claim 12, wherein the chemical crosslinking agent is a compound selected from the group consisting of tetraethyloxysilane (TEOS), polyaziridine, a melamine-based material, an epoxy-based material, and any combination thereof.

17. A conducting film useful for an organic opto-electronic device comprising the conducting polymer film composition according to claim 1.

18. An organic opto-electronic device comprising a conducting film according to claim 17.

19. The device according to claim 18, wherein the organic opto-electronic device is an organic electroluminescent device, an organic solar cell, an organic transistor or an organic memory device.

* * * * *

UNITED STATES PATENT AND TRADEMARK OFFICE

CERTIFICATE OF CORRECTION

PATENT NO. : 7,968,651 B2
APPLICATION NO. : 12/114018
DATED : June 28, 2011
INVENTOR(S) : Dal Ho Huh et al.

It is certified that error appears in the above-identified patent and that said Letters Patent is hereby corrected as shown below:

Omitted from the Title Page:

(30) Foreign Application Priority Data

~~Nov. 3, 2006~~ Nov. 3, 2005 (KR) ................ 2005-0105089

Signed and Sealed this
Eighth Day of November, 2011

David J. Kappos
*Director of the United States Patent and Trademark Office*